(12) United States Patent
Watanabe et al.

(10) Patent No.: US 8,082,380 B2
(45) Date of Patent: Dec. 20, 2011

(54) METHOD FOR OPTIMIZING OF COMMUNICATION SIGNAL

(75) Inventors: Hideaki Watanabe, Kasugai (JP); Hitoshi Ogawa, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 12/183,827

(22) Filed: Jul. 31, 2008

(65) Prior Publication Data
US 2009/0085634 A1    Apr. 2, 2009

(30) Foreign Application Priority Data
Sep. 28, 2007    (JP) ................. 2007-254858

(51) Int. Cl.
G06F 1/32    (2006.01)
(52) U.S. Cl. .................. 710/305; 713/320; 455/522
(58) Field of Classification Search .............. 455/69, 455/522; 713/320; 710/305
See application file for complete search history.

(56) References Cited

U.S. PATENT DOCUMENTS

| | | | | |
|---|---|---|---|---|
| 2,425,614 A * | 8/1947 | Goddard | ............ | 455/69 |
| 3,732,496 A * | 5/1973 | Boyer | ............ | 455/69 |
| 4,495,648 A * | 1/1985 | Giger | ............ | 455/73 |
| 4,580,262 A * | 4/1986 | Naylor et al. | ............ | 714/708 |
| 4,777,653 A * | 10/1988 | Bonnerot et al. | ............ | 455/69 |
| 5,305,468 A * | 4/1994 | Bruckert et al. | ............ | 455/69 |
| 5,333,175 A * | 7/1994 | Ariyavisitakul et al. | ...... | 455/423 |
| 5,465,398 A * | 11/1995 | Flammer | ............ | 455/69 |
| 5,465,399 A * | 11/1995 | Oberholtzer et al. | ........... | 455/69 |
| 5,604,730 A * | 2/1997 | Tiedemann, Jr. | ............ | 370/252 |
| 5,768,684 A * | 6/1998 | Grubb et al. | ............ | 455/13.4 |
| 6,061,427 A | 5/2000 | Ryoo | | |
| 6,330,462 B1 * | 12/2001 | Chen | ............ | 455/572 |
| 6,334,047 B1 * | 12/2001 | Andersson et al. | ............ | 455/69 |
| 6,466,609 B2 * | 10/2002 | Koslar et al. | ............ | 375/139 |
| 6,477,171 B1 * | 11/2002 | Wakeley et al. | ............ | 370/404 |
| 6,542,581 B2 * | 4/2003 | Suonsivu et al. | ............ | 379/1.04 |
| 6,647,058 B1 * | 11/2003 | Bremer et al. | ............ | 375/222 |
| 6,771,694 B1 * | 8/2004 | Baumgartner | ............ | 375/220 |
| 6,788,113 B2 * | 9/2004 | Watanabe et al. | ............ | 327/66 |

(Continued)

FOREIGN PATENT DOCUMENTS
EP    1484854    12/2004
(Continued)

OTHER PUBLICATIONS

"European Search Report of Application No. 08161499.2", Corresponding European Search Report citing 6 documents Mailed Jan. 12, 2009 regarding EU Application No. 08161499.2.
Anonymous Ed, "1394b IEEE Standard for a High-Performance Seral Bus-Amendment 2", Dec. 14, 2002, 1-369.

Primary Examiner — Paul R Myers

(57) ABSTRACT

A transceiver that reduces power consumption when data is transferred between devices in different modes. The transceiver is arranged in a first node and in a second node, which communicate between each other. A first control unit generates a first signal transmitted from the first node in predetermined time intervals during a first period that establishes an environment for communication between the first node and the second node. The second node transmits a second signal transmitted in response to the first signal. The first control unit generates a third signal upon detection of the second signal. A second control unit gradually decreases amplitude of the first signal based on the third signal to set the amplitude of the first signal to a predetermined amplitude so that the second node is receivable of the first signal.

16 Claims, 3 Drawing Sheets

U.S. PATENT DOCUMENTS

| | | | |
|---|---|---|---|
| 6,885,221 B2* | 4/2005 | Watanabe et al. | 327/23 |
| 7,046,966 B2* | 5/2006 | Davis | 455/69 |
| 7,079,717 B2* | 7/2006 | Liu et al. | 385/14 |
| 7,212,589 B2* | 5/2007 | Baumgartner | 375/325 |
| 2004/0221216 A1 | 11/2004 | Nack | |
| 2005/0163457 A1* | 7/2005 | Liu et al. | 385/147 |
| 2008/0034137 A1 | 2/2008 | Whitby-Strevens | |
| 2009/0100275 A1* | 4/2009 | Chang et al. | 713/300 |

FOREIGN PATENT DOCUMENTS

| | | |
|---|---|---|
| JP | 2003-46384 | 2/2003 |
| WO | WO 9908399 A2 * | 2/1999 |
| WO | WO-01/39481 | 5/2001 |

* cited by examiner

METHOD FOR OPTIMIZING OF COMMUNICATION SIGNAL

CROSS-REFERENCE TO RELATED APPLICATIONS

This application is based upon and claims the benefit of priority from the prior Japanese Patent Application No. 2007-254858, filed on Sep. 28, 2007, the entire contents of which are incorporated herein by reference.

BACKGROUND

1. Field

The present application relates to optimizing of communication signal.

2. Description of the Related Art

A device connected to a network that complies with the IEEE1394.b standard is operable in one of a plurality of different transfer speed modes. For example, a device may be operable in one of S400, S800, S1600, S3200 modes. Such a device is connected to a network by a cable. In these modes, devices generate output signals having amplitudes (output amplitudes). The maximum value of the output amplitudes is 800 mV and the same in each mode. However, these modes have different maximum transfer speeds and different tolerable minimum values for the output amplitudes. In such a network, power consumption of the device must be reduced while enabling stable communication between devices.

In the S400 mode, the maximum transfer speed is 500 Mbps, and the minimum value for the output amplitude is 300 mV. In the S800 mode, the maximum transfer speed is 1 Gbps, and the minimum value for the output amplitude is 350 mV. In the S1600 mode, the maximum transfer speed is 2 Gbps, and the minimum value for the output amplitude is 475 mV.

The maximum transfer speeds and minimum values of the output amplitudes for the IEEE 1394.b standard are higher than that for the IEEE 1394.a standard. Accordingly, in a network that is in compliance with the IEEE 1394.b standard, the power consumption tends to be greater than that of a network that is in compliance with the IEEE 1394.a standard.

To operate devices connected to a network in different modes, the minimum value of the output amplitude for a transmission circuit must be the same in each device. In such a case, to ensure stable data transmission, the minimum value of the output amplitude for each device must be set in accordance with the device having the highest minimum output amplitude.

Accordingly, when transmitting data from a device having a high transfer speed to a device having a low transfer speed, the minimum output amplitude becomes unnecessarily high. This results in unnecessary power consumption.

The standardized maximum length of a cable, which uses copper wires, for connecting devices is 4.5 m. However, a device used in a vehicle may require a longer cable. In such a case, to perform stable communication between devices, the output amplitude value must be set at a significantly higher level. As a result, for other devices that are connected by standardized cables, unnecessary power is consumed.

Further, if the output amplitude value is set to be high, this would increase the radiated electromagnetic waves and produce electromagnetic wave noise.

Japanese Laid-Out Patent Publication No. 2003-46384 describes an output circuit for setting the amplitude of an output signal to a desired value regardless of the resistance in a transmission path. However, the publication does not teach the reduction of power consumption in a device that operates in compliance with the IEEE 1394.b standard.

SUMMARY

The embodiment provides that a semiconductor device including a first control unit which generates a first signal transmitted from a first node in predetermined time intervals during a first period that establishes an environment for communication between the first node and the second node that communicates with the first node, detects a second signal transmitted from the second node in response to the first signal, and generates a third signal upon detection of the second signal, and a second control unit which decreases amplitude of the first signal based on the third signal to set the amplitude of the first signal to a predetermined amplitude so that the first signal is receivable with the second node.

BRIEF DESCRIPTION OF THE DRAWINGS

The embodiments, together with objects and advantages thereof, may be understood by reference to the following description of the presently embodiments together with the accompanying drawings in which.

DETAILED DESCRIPTION OF THE EMBODIMENTS

Figure 1:
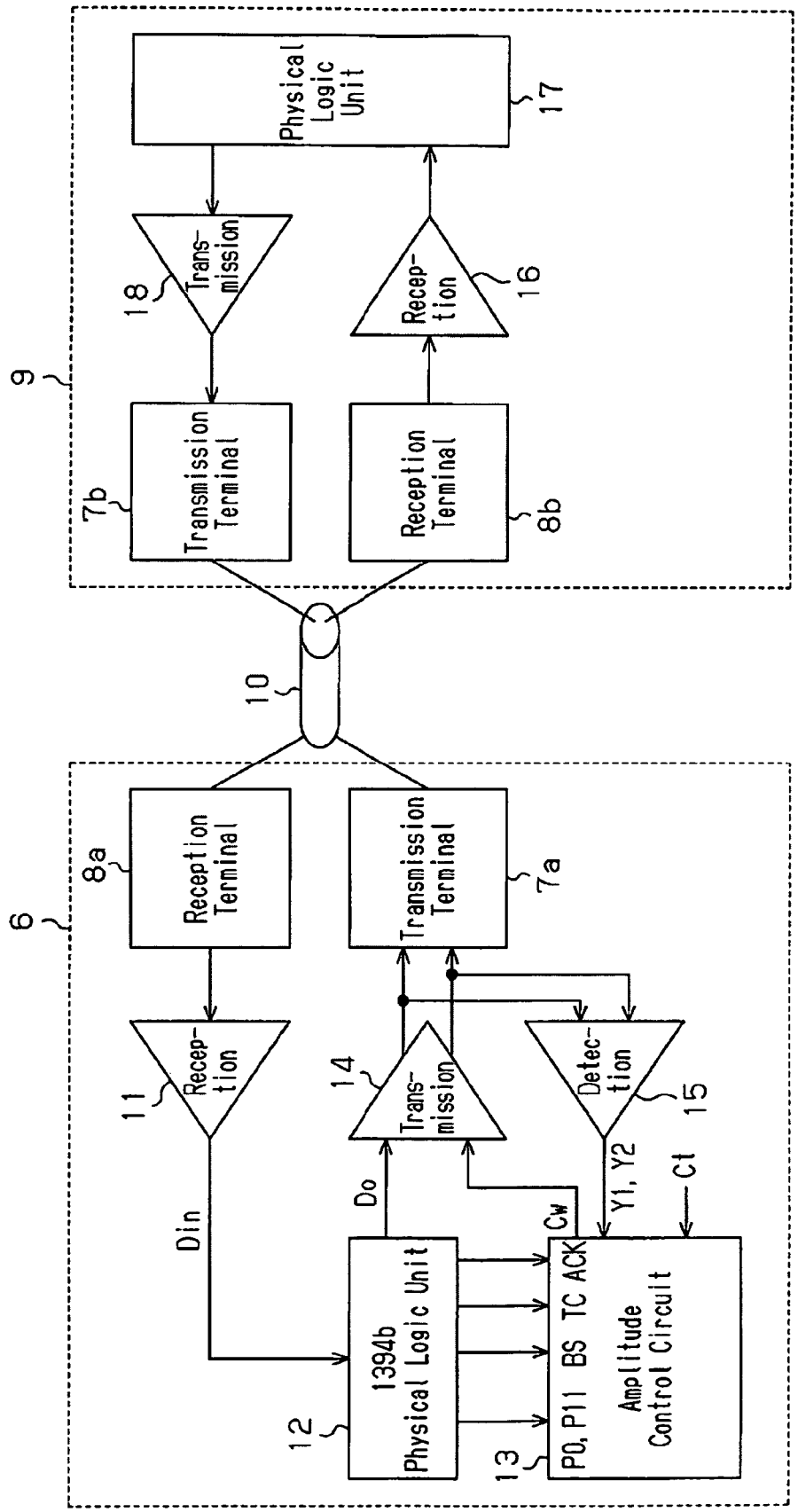
FIG. 1 is a block diagram of a transceiver that is in compliance with the 1394.b standard.

In the drawings, like numerals are used for like elements throughout.

Figure 2:
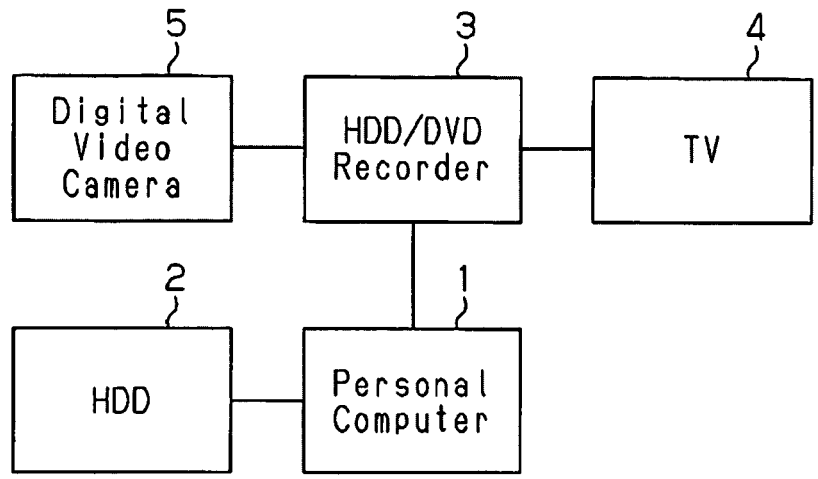
FIG. 2 is a block diagram of a network.

A transceiver according to a embodiment will now be described with reference to the drawings. In the embodiment, the transceiver is a semiconductor device. FIG. 2 shows an example of a network that is in compliance with the IEEE 1394.b standard. A personal computer 1 is connected to an externally connected hard disk drive 2 and a DVD recorder 3, which incorporates a hard disk. Data, such as image data or audio data, is transferable between the personal computer 1 and the hard disk drive 2. Data is also transferable between the personal computer 1 and the DVD recorder 3. Accordingly, data is transferable between the hard disk drive 2 and the DVD recorder 3 via the personal computer 1.

A television 4 and a digital video camera 5 are connected to the DVD recorder 3. Data is transferable between the digital video camera 5 and the DVD recorder 3. Image data recorded to the DVD recorder 3 is transferable to the television 4.

Further, image data recorded to the digital video camera 5 may be transferred via the DVD recorder 3 to the television 4 for reproduction. The image data recorded to the digital video camera 5 may also be transferred via the DVD recorder 3 to the personal computer 1 of the hard disk drive 2 for recording.

FIG. 1 shows a transceiver unit incorporated in each device that is shown in FIG. 2. The transceiver unit of each device implements a transmission function for transmitting transfer data and a reception function for receiving transfer data. Hereafter, a transmission node (first node) for transmitting transfer data and a reception node (second node) for receiving transfer data will be described.

A transmission node 6, which transmits transfer data, includes a transmission terminal 7a and a reception terminal 8a. A reception node 9, which receives transfer data from the transmission node 6, includes a transmission terminal 7b and a reception terminal 8b. The transmission terminal 7a and reception terminal 8a are connected to the transmission terminal 7b and reception terminal 8b by a cable 10 in a manner enabling bi-directional parallel communication. The transmission terminals 7a and 7b and the reception terminals 8a and 8b each include a terminal resistor having the same resistance.

The transmission node 6 receives a signal (e.g., response signal) transferred from the reception node 9 via the reception terminal 8a with the reception circuit 11. The reception circuit 11 provides such a reception signal Din to a physical logic unit 12 (first control unit) that is in compliance with the IEEE 1394.b standard.

In response to the reception signal Din, the physical logic unit 12 provides an amplitude control circuit 13 (second control unit) with various types of control signals. The physical logic unit 12 also provides a transmission circuit 14 with transmission data Do. The amplitude control circuit 13 provides the transmission circuit 14 with an amplitude value control signal Cw.

The transmission circuit 14 generates the transmission data Do as a differential signal and controls the amplitude of the differential signal based on the amplitude value control signal Cw. The output signal (differential signal) of the transmission circuit 14 is transmitted via the transmission terminal 7a.

The differential signal output from the transmission circuit 14 is provided to a connection detection circuit 15. The connection detection circuit 15 detects amplitude changes in the output signal of the transmission circuit 14 to detect whether or not the transmission node 6 and reception node 9 are connected. Then, the connection detection circuit 15 provides the amplitude control circuit 13 with detection signals Y1 and Y2 (eighth signal).

More specifically, when the transmission node 6 is connected to the reception node 9 by a cable, the terminal resistor of the transmission terminal 7a and the terminal resistor of the reception terminal 8b in the reception node 9 are connected to each other in parallel. In this state, the amplitudes of output signals (output amplitude) from the transmission circuit 14 are constant. In a state in which the reception terminal 8b (i.e., reception node 9) is connected to the transmission node 6, the output amplitude is decreased to one half of that in a state in which the reception terminal 8b is not connected.

The amplitude control circuit 13 is provided with an adjustment time control signal Ct. An external circuit (not shown) that sets the time for performing synchronization between the transmission node and the reception node 9 provides the adjustment control signal Ct.

In the reception node 9, a reception circuit 16 receives a reception signal via the reception terminal 8b and provides the reception signal to a physical logic unit 17. Further, when the reception node 9 is undergoing a transmission operation, a transmission circuit 18 transfers a transmission signal from the physical logic unit 17 to the transmission node 6 via the transmission terminal 7b.

Figure 3:
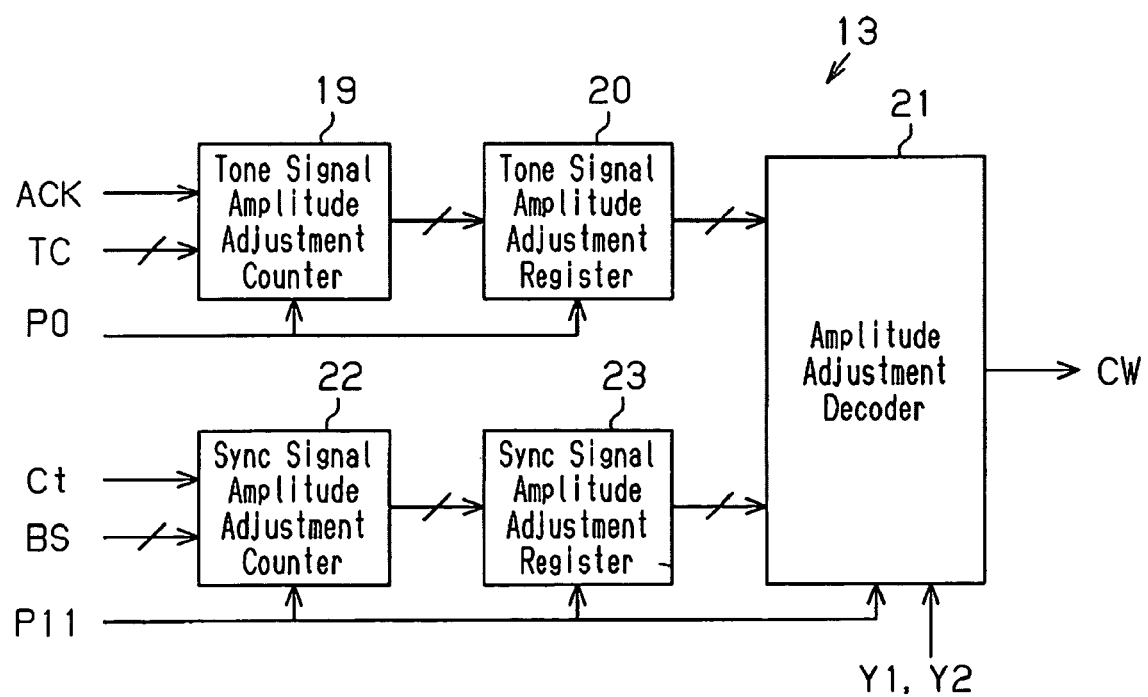
FIG. 3 is a block diagram of an amplitude control circuit.

FIG. 3 shows in detail the configuration of the amplitude control circuit 13 in the transmission node 6. The physical logic unit 12 provides an amplitude adjustment counter 19 with an acknowledgement detection signal ACK (third signal and sixth signal), a tone count value TC (fourth signal), and port state signal PO. The acknowledgment detection signal ACK (hereafter referred to as the detection signal ACK) will now be described. To establish communication with the reception node 9, the transmission node 6 transmits tone signals (first signal) at predetermined timings to the reception node 9. When receiving the tone signals, the reception node 9 transmits to the transmission node 6 tone signals (second signal), each including the ACK signal. When detecting transmission of the ACK signal from the reception node 9, the transmission node 6 generates the detection signal ACK.

When receiving a tone signal as the reception signal Din and detecting the ACK signal from the reception signal Din, the physical logic unit 12 provides the detection signal ACK to the amplitude control circuit 13. Further, when receiving a tone signal, the physical logic unit 12 updates a tone count value TC and provides the tone count value TC to the amplitude control circuit 13. The tone count value TC indicates the number of times tone signals have been transmitted from the physical logic unit 12. The port state signal PO indicates the state of a port. When outputting a tone signal as the transmission data Do, the physical logic unit 12 outputs a port state signal PO.

When a detection signal ACK is input in a state in which the port state signal PO is input, the tone signal amplitude adjustment counter 19 increments an amplitude adjustment value in accordance with the updating of the tone counter TC and provides a tone signal amplitude adjustment register 20 with the incremented amplitude adjustment value. When a detection signal ACK is not input, the tone signal amplitude adjustment counter 19 decrements the amplitude adjustment value in accordance with the updated tone counter TC and provides the tone signal amplitude adjustment register 20 with the decremented amplitude adjustment value.

The tone signal amplitude adjustment register 20 is also provided with the port state signal PO. In a state in which the port state signal PO is input, the tone signal amplitude adjustment register 20 holds the count value (amplitude adjustment value) from the tone signal amplitude adjustment counter 19 and provides an amplitude adjustment decoder 21 (third control unit) with the count value.

A synchronization signal amplitude adjustment counter 22 is provided with an adjustment time control signal Ct, a beta port state signal BS, and a port state signal P11. The port state signal P11 indicates the state of a port. When outputting a synchronization signal as transmission data Do, the physical logic unit 12 outputs the port state signal P11. The beta port state signal indicates the state of signal transmission and reception in a beta mode. The beta mode is a mode in which communication is performed between IEEE 1394.b devices.

When a synchronization signal is transferred between the transmission node 6 and the reception node 9, the synchronization signal amplitude adjustment counter 22 is provided with the port state signal P11. In response to the beta port state signal BS, the synchronization signal amplitude adjustment counter 22 increments an amplitude adjustment value and provides the amplitude adjustment value to a synchronization signal amplitude adjustment register 23. When the reception node 9 does not receive a synchronization signal from the transmission node 6, the transmission node 6 does not receive a synchronization signal from the reception node 9. In this case, the synchronization signal amplitude adjustment counter 22 decrements the amplitude adjustment value in response to the beta port state signal BS.

The port state signal P11 is also provided to the synchronization signal amplitude adjustment register 23. In a state in which the port state signal P11 is input, the synchronization signal amplitude adjustment register 23 holds a count value (amplitude adjustment value) from the synchronization signal amplitude adjustment counter 22 and provides the count value to the amplitude adjustment decoder 21.

The port state signal P11 is further provided to the amplitude adjustment decoder 21. In a state in which the port state signal P11 is input (enable state), the amplitude adjustment decoder 21 generates an amplitude value control signal Cw (fifth signal) based on the count value from the synchronization signal amplitude adjustment register 23. In a state in which the port state signal P11 is not input (disable state), the amplitude adjustment decoder 21 generates the amplitude value control signal Cw based on the count value from the tone signal amplitude adjustment register 20.

Figure 4:
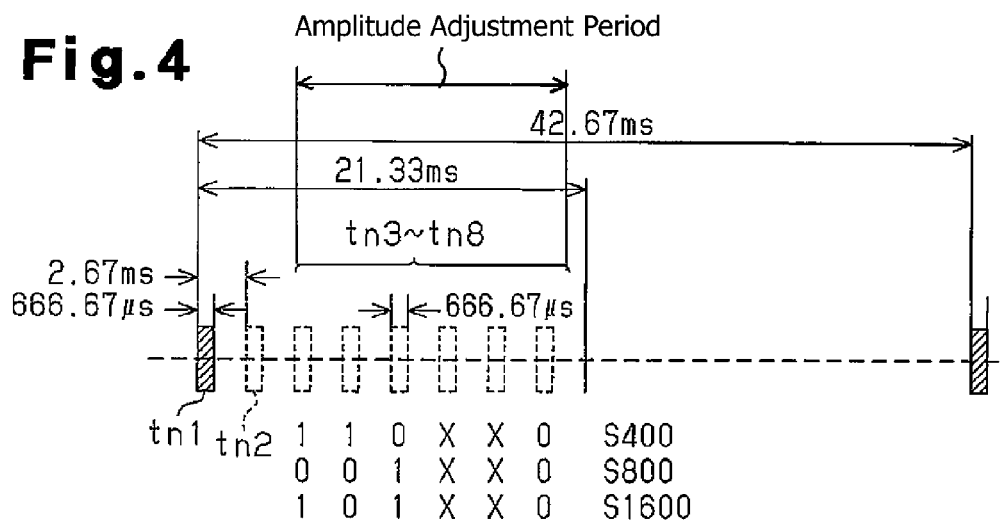
FIG. 4 is a diagram illustrating a transfer speed setting operation.

FIG. 4 shows the transmission data Do when the transmission node 6 undergoes a transfer speed setting operation (first period). The transmission node 6 sets the environment for communication between the two nodes 6 and 9 in the transfer speed setting operation.

The transmission node 6 first outputs a tone signal tn1 to check the existence of the reception node 9, which is a communication peer, before starting communication. The tone signal tn1 is output at intervals of 42.67 ms for time periods of 667.67 μs.

When detecting the tone signal tn1, the reception node 9 transmits a tone signal, which includes the ACK signal, to the transmission node 6. The transmission node 6 receives the tone signal as the reception signal Din. When detecting the ACK signal from the reception signal Din, the physical logic unit 12 recognizes connection of the reception node 9 and provides the detection signal ACK to the amplitude control circuit 13.

After detection of the ACK signal, the physical logic unit 12 outputs the next tone signal tn2 as the ACK signal and outputs transfer speed information with the following tone signals tn3 to tn8. The transfer speed information represented by the tone signals tn3 to tn8 is a predetermined code string representing one of S400, S800, and S1600 modes. For example, for the S400 mode, transfer speed information in a code string of "110XX0" is output by the tone signals tn3 to tn8. When a code of "0" is output, the output of a tone signal having a time period of 667.67 μs is suspended. The tone signals tn3 to tn8 are transmitted in predetermined time intervals.

The transmission node 6 exchanges transfer speed information with the reception node 9 and selects a mode for setting the transfer speed.

Figure 5:
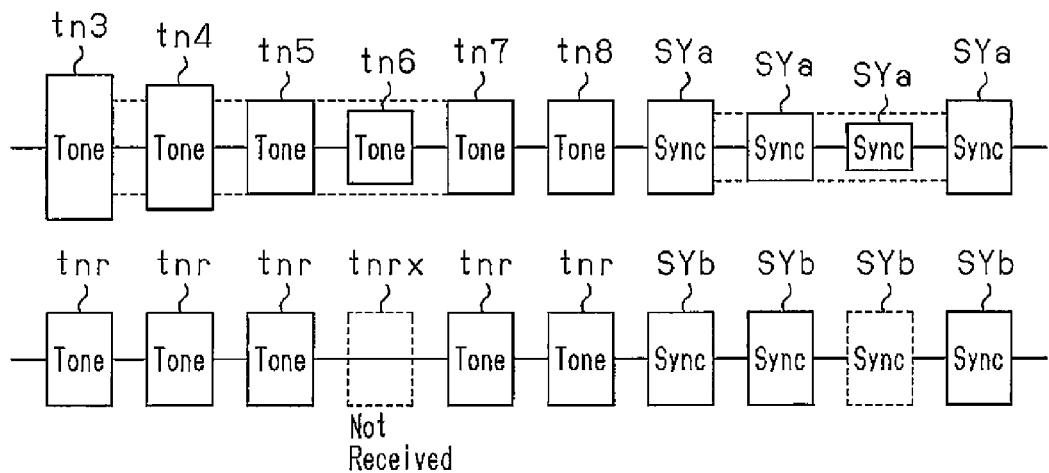
FIG. 5 is a diagram illustrating an amplitude adjustment operation.

Parallel to the setting operation of the transfer speed, the transmission node 6 undergoes an operation for setting the amplitude of the tone signal as the minimum amplitude for enabling transmission and reception of a signal between the transmission node 6 and the reception node 9. This operation is shown in FIG. 5.

When receiving a tone signal, which includes the ACK signal, from the reception node 9 and thereby recognizing that the reception node 9 is connected, the transmission node 6 outputs the ACK signal (Tn2). Then, the transmission node 6 shifts to an amplitude adjustment mode for adjusting the amplitudes of the tone signals tn3 to tn8.

When the detection signal ACK is input in a state in which the port state signal PO is input, the tone signal amplitude adjustment counter 19 of the amplitude control circuit 13 decrements the amplitude adjustment value in response to the updating of the tone count value TC and provides the amplitude adjustment value to the tone signal amplitude adjustment register 20.

The first tone signal tn3 output from the transmission node 6 subsequent to the ACK signal (tn2) is output with the maximum amplitude for the mode that is to be set. When receiving the tone signal tn3, the reception node 9 transmits a tone signal tnr, which includes the ACK signal, to the transmission node 6. The physical logic unit 12 of the transmission node 6 detects the ACK signal and provides the detection signal ACK to the amplitude control circuit 13.

The tone signal amplitude adjustment counter 19 increments the count value (amplitude adjustment value) whenever outputting a tone signal. Based on the amplitude adjustment value, the amplitude adjustment decoder 21 generates the amplitude value control signal Cw. This operation is repeated to gradually decrease the amplitudes of the tone signals as shown in FIG. 5.

When decreasing the amplitudes of the tone signals, the amplitudes of the tone signals tn3 to tn6 are gradually decreased in the manner of 0.9, 0.8, and 0.7 times the maximum amplitude value (amplitude of the tone signal tn3).

The maximum value of the amplitudes of the tone signals differ between the S400, S800, and S1600 modes. When the maximum value is 1.0 for the S1600 mode, the maximum value for the S800 mode is 0.8 times of that for the S1600 mode, and the maximum value for the S400 is 0.667 times of that for the S400 mode.

During the process for gradually decreasing the amplitudes of the tone signals tn3 to tn6, for example, if the reception node 9 does not
receive the tone signal tn6, the reception node 9 transmits a tone signal tnrx, which does not include the ACK signal, to the transmission node 6.

In this case, the transmission node 6 does not detect the ACK signal and thus does not provide the amplitude control circuit 13 with the detection signal ACK. Accordingly, the tone signal amplitude adjustment counter 19 performs decrementing in response to the updating of the tone count value TC. As a result, the amplitude of the tone signal tn7, which is output next from the transmission node 6, returns to the same amplitude as the tone signal tn5. Then, the amplitude adjustment operation is completed. In other words, when the detection signal ACK is not provided to the amplitude control circuit 13, the tone signal amplitude adjustment counter 19 suspends counting after performing decrementing.

Such operations converge the amplitudes of tone signals to a level that is close to the minimum amplitude required for transferring signals between the transmission node 6 and the reception node 9.

When the tone signals tn3 to tn8 are output from the transmission node 6, the transfer speed setting operation is completed. Then, the transmission node 6 performs a synchronization operation. During the synchronization period (second period), the transmission node 6 transmits synchronization signals SYa (seventh signal) in predetermined time intervals to the reception node 9 based on the adjustment time control signal Ct.

When the synchronization signals are being transferred between the transmission node 6 and the reception node 9, the synchronization signal amplitude adjustment counter 22 increments the amplitude adjustment value in response to the beta port state signal BS. The incrementing gradually decreases the amplitudes of the synchronization signals output from the transmission node 6 as shown in FIG. 5.

When the amplitude of the synchronization signal SYa becomes small, the reception node 9 does not receive the synchronization signal. Thus, the reception node 9 does not transmit a synchronization signal SYb from the transmission node 6. In such a case, the synchronization signal amplitude adjustment counter 22 of the transmission node 6 decrements the amplitude adjustment value in response to the beta port state signal BS. Accordingly, the amplitude of the synchronization signal SYa is increased based on the amplitude adjustment value.

The change amount in the amplitude value of the synchronization signal SYa that corresponds to the minimum change in the count value of the synchronization signal amplitude adjustment counter 22, is sufficiently less than the change amount in the amplitude value of the tone signal that corresponds to the minimum change in the count value of the tone signal amplitude adjustment counter 19. Accordingly, the amplitude value of the synchronization signal SYa converges at a level that is substantially equal to the minimum level required for the transfer of signals between the transmission node 6 and the reception node 9. Signal transfer operations subsequent to the synchronizing are continued at this amplitude.

Figure 6:
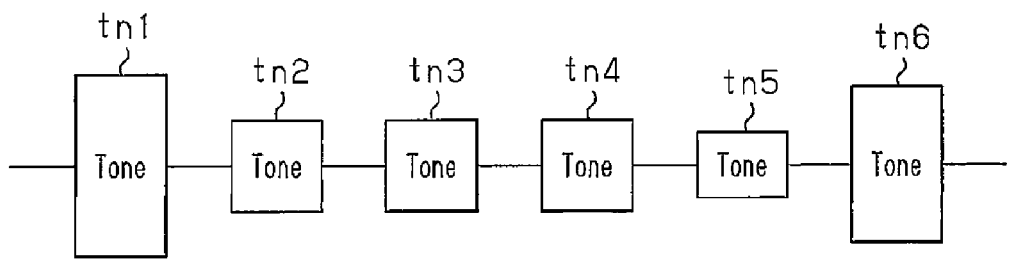
FIG. 6 is a diagram illustrating the amplitude adjustment operation when a communication peer is unconnected.

The existence of the reception node 9, which is a communication peer, is checked before the transmission node 6 starts communication. FIG. 6 shows the operations that are performed when connection with the reception node 9 does not be detected. As shown in the drawing, when the transmission node 6 checks for the reception node 9, the tone signal tn1 is output with the maximum amplitude. If the reception node 9 is not connected, the terminal resistor of the reception terminal 8a in the reception node 9 is not connected to the transmission terminal 7a of the transmission node 6. In this case, the amplitude of the tone signal tn1 output from the transmission circuit 14 is two times greater than the normal maximum amplitude.

As a result, the connection detection circuit 15 of the transmission node 6 detects an increase in the amplitude of the tone signal tn1 and provides the amplitude control circuit 13 with the connection detection signal Y1, which indicates that the reception node 9 is unconnected.

The amplitude control circuit 13 provides the transmission circuit 14 with the amplitude control signal Cw, which is preset, in response to the connection detection signal Y1. Afterwards, the tone signals output from the transmission circuit 14 subsequent to the tone signal tn2 are continuously output with a small amplitude that is preset by the amplitude adjustment decoder 21.

Further, after the tone signals tn2 to tn4 are output with a small amplitude from the transmission circuit 14, the tone signal tn5 is output. During transmission of the tone signal tn5, if a new reception node 9 is connected, the amplitude of the tone signal tn5 is decreased by one half. As a result, the connection detection circuit 15 detects the change in the amplitude and provides the connection detection signal Y2 to the amplitude adjustment decoder 21 of the amplitude control circuit 13.

The amplitude adjustment decoder 21 provides the transmission circuit 14 with the amplitude value control signal Cw, which is preset, in response to the connection detection signal Y2. As a result, the tone signal tn6 is output with the maximum amplitude from the transmission circuit 14. Then, the transfer speed setting operation shown in FIG. 4 is performed.

The embodiment has the advantages described below.

(1) When the transmission node 6 and the reception node 9 undergo the transfer sped setting operation, the transmission node 6 detects the minimum amplitude required for the transfer of signals and subsequently transfers signals with the detected amplitude. This reduces power consumption and electromagnetic noise in the transceiver.

(2) Regardless of the modes or cable lengths of the transmission node 6 and the reception node 9, the transmission node 6 automatically sets the minimum amplitude required for transferring signals between the two nodes.

(3) The transmission node 6 gradually decreases the amplitudes of the tone signals transmitted to the reception node 9 during the transfer speed setting operation and determines whether or not the reception node 9 is receivable of the tone signals. Thus, the minimum amplitude required for transferring signals between the two nodes 6 and 9 is automatically set.

(4) During the transfer signal synchronization that follows the transfer speed setting operation, the transmission node 6 gradually decreases the amplitudes of the synchronization signals transmitted to the reception node and determines whether or not the reception node 9 is receivable of the synchronization signals. Thus, the minimum amplitude required for transferring signals between the two nodes 6 and 9 is automatically set.

(5) The decreased amount of the amplitude of the synchronization signal is finely set. This enables accurate setting of the required minimum amplitude.

(6) When the reception node 9 is not connected to the transmission node 6, the amplitude of a tone signal for detecting a communication peer is restricted to a preset amplitude, which is small. This reduces power consumption during the detection of a communication peer.

(7) When a communication peer is connected in a state in which the tone signal transmitted to detect a communication peer is restricted to a preset amplitude, which is small, the tone signal is set to the maximum amplitude. Accordingly, the transmission node 6 may subsequently shift to the transfer speed setting operation.

It should be apparent to those skilled in the art that the aforementioned embodiment may be embodied in many other specific forms without departing from the spirit or scope of the embodiment. Particularly, it should be understood that the embodiment may be embodied in the following forms.

The amplitude adjustment operation for synchronization signals may be eliminated such that the amplitude adjustment operation for tone signals is performed during the transfer speed setting operation.

The present examples and embodiments are to be considered as illustrative and not restrictive, and the invention is not to be limited to the details given herein, but may be modified within the scope and equivalence of the appended claims.

What is claimed is:

1. A semiconductor device comprising:
a first control unit which generates a first signal transmitted from a first node in predetermined time intervals during a first period that establishes an environment for communication between the first node and a second node that communicates with the first node, the first signal including a transfer speed information for setting a transfer speed between the first node and the second node, detects a second signal transmitted from the second node in response to the first signal, and generates a third signal upon detection of the second signal; and
a second control unit which decreases amplitude of the first signal based on the third signal to determine a minimum amplitude of the first signal that is receivable with the second node, wherein the second control unit adjusts the amplitude of the first signal indicating the transfer speed information, concurrently with setting the transfer speed by using the transfer speed information.

2. The semiconductor device according to claim 1, wherein:
the first control unit generates a fourth signal based on output of the first signal; and the second control unit comprises:
   a counter which increments a count value based on the fourth signal when the third signal is input from the first control unit; and
   a third control unit which generates a fifth signal for adjusting the amplitude of the first signal based on the count value of the counter.

3. The semiconductor device according to claim 2, wherein:
   the counter decrements the count value based on the fourth signal when the third signal is not input from the first control unit;
   the first control unit generates a sixth signal for suspending operation of the counter after decrementing the count value.

4. The semiconductor device according to claim 2, wherein the second control unit further includes a register which holds the count value of the counter and provides the third control unit with the held count value.

5. The semiconductor device according to claim 1, wherein the first control unit generates a seventh signal transmitted from the first node in predetermined time intervals during a second period that follows the first period, the semiconductor device further comprising:
   a fourth control unit which gradually decreases amplitude of the seventh signal to set the amplitude of the seventh signal to a predetermined amplitude so that the second node is receivable of the seventh signal.

6. The semiconductor device according to claim 5, wherein the fourth control unit sets the amplitude of the seventh signal output first from the first control unit to the amplitude of the first signal.

7. The semiconductor device according to claim 6, wherein the fourth control unit sets the amplitude of the seventh signal to be smaller than the amplitude of the first signal.

8. The semiconductor device according to claim 5, wherein the first control unit, the second control unit, and the fourth control unit operate in the second period in the same manner as in the first period to adjust the amplitude of the seventh signal.

9. The semiconductor device according to claim 5, wherein the first period is for setting a communication speed for the first node and the second node, and the second period is for synchronizing the first node and the second node.

10. The semiconductor device according to claim 1, further comprising:
   a detector which detects whether or not the second node is connected to the first node based on the amplitude of the first signal to generate an eighth signal; and
   the second control unit decreases the amplitude of the first signal based on the eighth signal when the second node is unconnected.

11. The semiconductor device according to claim 1, wherein the first node and the second node performs communication based on the IEEE 1394.b standard.

12. A method for optimizing the amplitude of a signal, the method comprising:
   transmitting tone signals from a transmission node to a reception node that communicates with the transmission node, the tone signals including a transfer speed information for setting a transfer speed between the transmission node and the reception node;
   decreasing amplitudes of the tone signals to detect a minimum amplitude of the tone signals that enables communication between the transmission node and the reception node, wherein the decreasing includes adjusting the amplitudes of the tone signals indicating the transfer speed information, concurrently with setting the transfer speed by using the transfer speed information; and
   setting, after detection of the minimum amplitude, the amplitude of a transmission signal transmitted from the transmission node to the detected minimum amplitude.

13. A communication system comprising:
   a first node; and
   a second node that communicates with the first node;
   wherein the first node comprises:
      a first control unit which generates a first signal transmitted from the first node in predetermined time intervals during a first period that establishes an environment for communication between the first node and the second node, the first signal including a transfer speed information for setting a transfer speed between the first node and the second node, detects a second signal transmitted from the second node in response to the first signal, and generates a third signal upon detection of the second signal; and
      a second control unit which determines a minimum amplitude of the first signal that is receivable with the second node based on the third signal, wherein the second control unit adjusts the amplitude of the first signal indicating the transfer speed information, concurrently with setting the transfer speed by using the transfer speed information.

14. The semiconductor device according to claim 1, wherein:
   the second control unit decreases amplitude of the first signal based on the third signal, and increases the amplitude of the first signal when the first control unit does not detect the second signal after transmitting the first signal, thereby setting the amplitude of the first signal to the minimum amplitude.

15. The method according to claim 12, further comprising:
   in response to receiving one of the tone signals, transmitting an acknowledge signal from the reception node to the transmission node,
   wherein said decreasing amplitudes of the tone signals includes:
      decreasing the amplitudes of the tone signals when the transmission node receives the acknowledge signal and increasing the amplitudes of the tone signals when the transmission node does not receive the acknowledge signal, thereby detecting the minimum amplitude of the tone signals.

16. The communication system according to claim 13, wherein:
   the second control unit decreases amplitude of the first signal based on the third signal, and increases the amplitude of the first signal when the first control unit does not detect the second signal after transmitting the first signal, thereby setting the amplitude of the first signal to the minimum amplitude.

* * * * *